United States Patent [19]

Cook et al.

[11] Patent Number: 4,677,277
[45] Date of Patent: Jun. 30, 1987

[54] ARC WELDING INSTRUCTION MONITOR

[76] Inventors: Marvin D. Cook, 420 Field Dr., Golden Valley, Minn. 55427; Clifford D. Martin, 6020 E. Rattlesnake Rd., Missoula, Mont. 59801

[21] Appl. No.: 796,592

[22] Filed: Nov. 8, 1985

[51] Int. Cl.[4] .............................................. B23K 9/10
[52] U.S. Cl. ................................. 219/130.01; 219/136
[58] Field of Search ....................... 219/130.01, 137.71, 219/124.03, 136

[56] References Cited

U.S. PATENT DOCUMENTS

| | | | |
|---|---|---|---|
| 2,045,801 | 6/1936 | Richter | 219/130.01 |
| 3,679,865 | 7/1972 | Jesnitzer et al. | 219/130.01 |
| 4,288,682 | 9/1981 | Toth | 219/137.71 |
| 4,375,026 | 2/1983 | Kearney | 219/130.01 |
| 4,471,207 | 9/1984 | Hawkes | 219/130.01 |

FOREIGN PATENT DOCUMENTS 556908 11/1977 U.S.S.R. ......................... 219/130.01

Primary Examiner—Clifford C. Shaw
Attorney, Agent, or Firm—Joseph F. Breimayer

[57] ABSTRACT

A monitor designed to aid in the instruction of electric arc welding. The device is electrically isolated from the welder arc voltage by an optical coupling device which provides an isolated output signal linearly proportional to either arc voltage or arc current. Audio alarms are triggered when the arc voltage is either too high or too low indicating arc lengths that are too low indicating arc lengths that are too long or too short to provide acceptable weld quality. A self test switch is included to demonstrate the upper and lower voltage alarm operation.

4 Claims, 2 Drawing Figures

ARC WELDING INSTRUCTION MONITOR

BACKGROUND OF THE INVENTION

1. Field of the Invention

This invention relates generally to a monitor designed to aid in the instruction of electric arc welding, and more particularly to an audio monitor for use in instruction and training in the art of welding with both AC and DC welding equipment.

2. Related Art

Arc welding is widely used in the fabrication and repair of metal structures. In general, the source of heat for melting the weld material is an electric welding arc which is commonly referred to as an arc current flowing in the form of a plasma or gaseous conductor. The welding arc flows between the welding electrode and the work piece. The distance between the electrode and the work piece constitutes the arc length, and it may vary as the electrode is consumed.

The arc voltage or current across a welding arc represents very closely the arc length conditions when other conditions of the arc, such as the character of the weld rod used and the type of metal constituting the work pieced, are kept constant. A welding operator usually attempts to hold an arc of a constant length, the value of which is suitable to his conditions of welding, including the composition of the work piece.

A skillful arc welder learns to recognize the sights and sounds associated with a good weld. The skilled welder therefore controls the arc length by adjustment of the electrodes so as to produce a satisfactory weld for the material of the work piece. However, a student learning the art of arc welding frequently finds it difficult to maintain the proper arc length and to become conditioned to the sights and sounds associated with a satisfactory continuous weld.

Various attempts have been made at providing systems for monitoring arc weld length and to provide a form of feedback to the arc welder. For example, U.S. Pat. No. 4,471,207 to Hawkes shows a system for providing an audible feedback signal relating to output current and voltage to provide a synthesized feedback signal having a voltage proportional pitch and current proportional volume or current proportional warble component to the tone.

U.S. Pat. No. 4,375,026 to Kierney describes a monitor for weld arc voltage, current and travel speed. The Kierney invention includes sensors for measuring arc voltage which measurement is run through signal conditioners and the output is sent to comparators for comparison to a reference. High and low alarm signals are used if the arc voltage, current or travel speed are not maintained within preset limits.

U.S. Pat. No. 3,679,865 to Jesnitzer et al discloses an apparatus for controlling electric welding processes wherein microphones or suitable current or voltage transducers produce a signal bearing in response to the discontinuous deposition of metal from the electrode to the object being welded. This signal is shaped in a pulse shape for use to provide an output, either through a gauge or loudspeaker which it helpful to the welder in providing high quality welds.

While these prior approaches appear to be meritorious, they suffer from being unduly complex for practical use in the instruction in welding. Furthermore, there are practical problems associated with these devices for use with both AC or DC welders and in the isolation of the monitoring circuitry from the welding current or voltage.

SUMMARY OF THE INVENTION

An object of the present invention is to provide a weld quality monitor which is capable of monitoring essential welding parameters without interfering with the welding current or voltage. A further object of the present invention is to provide such a monitor for use in classroom instruction wherein the monitor is safely isolated from the welder and may be employed with both AC and DC welding equipment.

A further object of the present invention is to provide a welding student with an audible indication or alarm whenever the arc length either becomes too long or too short for the arc voltage and current necessary to properly weld a given work piece.

A still further object of the present invention is to provide such a simplified monitor which may be manually calibrated by the instructor and where the calibration limits may be adjusted during the actual welding process without danger of damaging the monitoring equipment.

In accordance with the above and other objects, the present invention comprises a weld quality monitor adapted to be connected at its input across the welder electrode and work piece, rectifying means for rectifying the welding current to develop a DC voltage proportional to the voltage across the arc; opto-isolator means for developing an optical signal from the rectified welding voltage for providing an isolated output signal proportional to that rectified weld voltage; a high voltage detector means responsive to the output signal of the opto-isolator means for producing a high voltage trigger signal whenever the output signal exceeds a high voltage reference level; a low voltage detector means responsive to the output signal of said opto-isolator means for producing a low voltage trigger signal whenever said output signal falls below a preset low voltage reference level; a first tone generator means responsive to the high voltage trigger signal for producing a first audible tone when said high voltage detector means is triggered; and a low voltage tone generator means responsive to the low voltage trigger signal for producing a second audible tone, whereby the audible tone of the high voltage oscillator means indicates that the arc voltage is too high and the arc should be shortened to decrease the voltage and whereby the output tone of the low voltage output means indicates to the operator that the arc voltage is too low and that the arc should be lengthened.

A principal feature of the present invention resides in the opto-electric isolator element which provides a signal which is directly proportional to the arc voltage or current. The monitor circuit includes adjustable means for adjusting the high and low voltage reference levels to which the reference inputs of the high and low voltage detectors are connected. The monitor circuit can operate at a relatively low voltage and current drain and may, in fact, be battery powered.

BRIEF DESCRIPTION OF THE DRAWINGS

Additional objects and features of the present invention will become readily apparent when the same is set forth in greater detail in the accompanying detailed description of the preferred embodiment with reference being made to the drawings in which like reference numerals represent like or similar parts throughout and in which.

DESCRIPTION OF THE PREFERRED EMBODIMENT

Figure 1:
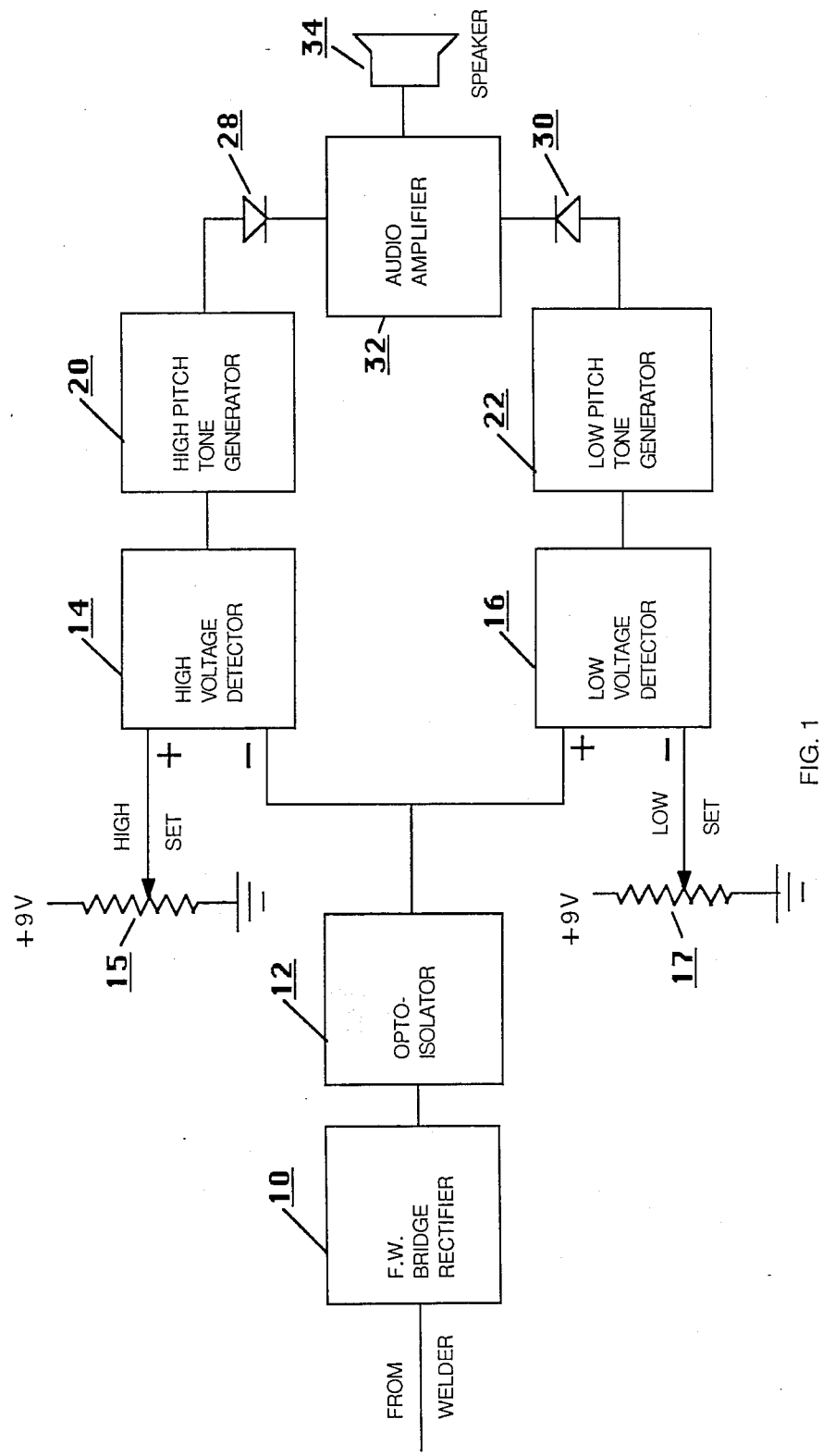
FIG. 1 is a block diagram of the instructional monitor apparatus of the present invention.

Turning now to the drawings and first to FIG. 1, there is shown a block diagram of the instruction monitor of the present invention. Very generally, the block diagram illustrates the high voltage detector and low voltage detector circuits which are interposed between the welder and speaker. The current from the welder is rectified by full wave rectifier 10 and applied to an opto-isolator 12 and from it to the high and low voltage detectors 14, 16 and tone generators 20, 22 which generate high and low pitch tones in the event that the arc weld length is too long or too short, respectively.

The bridge rectifier 10 is coupled across the welder output or input circuit to develop a voltage proportional to the voltage or current across the arc welder electrode and work piece (not shown). That voltage is applied to the opto-isolator 12 which produces a signal proportional to the voltage developed by the bridge rectifier 10 and isolates the low voltage portion of the circuit from the welder itself. The output of the opto-isolator 12 is applied to the negative and postive inputs of the high voltage detector 14 and the low voltage detector 16. The positive input of the high voltage detector 14 is applied to a high set voltage reference 15 that can be manually adjusted to trigger the high pitch tone generator 20 when the arc length is too long. Similarly, the low voltage detector 16 is coupled at its negative input to a low set voltage reference 17 which is manually adjusted to trigger the low pitch tone generator 22 when the arc length is too short. In other words, the high set reference voltage provided at the variable resistor 15 and the low set voltage reference developed at the variable resistor 17 may be adjusted while the welder is being operated to high and low voltage reference points indicative of the high and low arc length limits. A skilled instructor observes the arc length and determines the high and low arc lengths for satisfactory welds and sets the reference voltages accordingly so that the actual voltage is developed by the opto-isolator 12 does not develop a high or low pitch alarm.

The output of the high voltage detector 14 is applied to the high pitch tone generator 20, and the output of the low voltage detector 16 is applied to the low pitch tone generator 22 which respectively generate high and low pitch tone signals whenever the voltage exceeds the high and low set reference voltages. Only one or the other of the generators will be triggered and the signals are respectively passed by diodes 28, 30 to an audio amplifier 32. The amplifier signal is applied to speaker 34 or to earphones separately to optical alarms as is known in the prior art.

Figure 2:
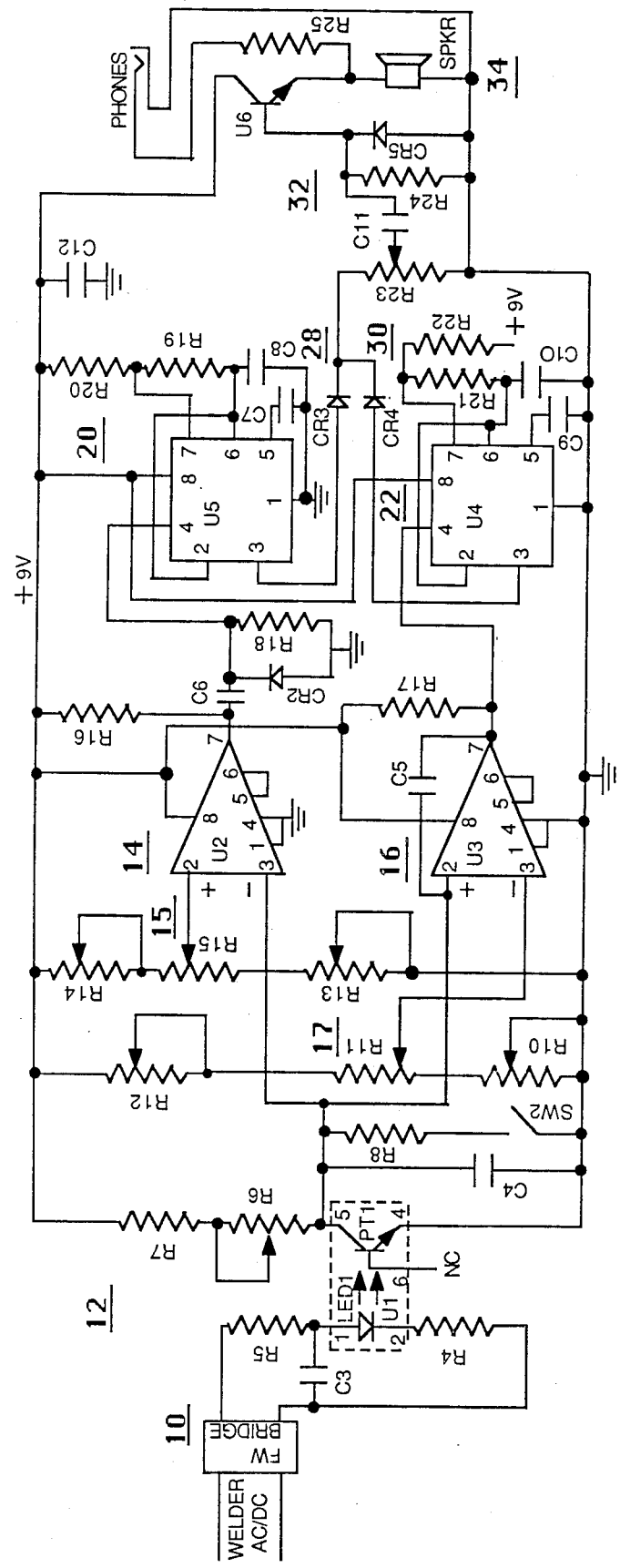
FIG. 2 is a schematic representation of the circuit of the instructional apparatus showing the interconnection with the welding equipment.

Turning now to FIG. 2, there is shown in more detail a schematic of the instruction monitor of the present invention. At the left, the welder input or output is applied to the full wave bridge rectifier 10 which develops a voltage across capacitor C3 through resistor R5. The light emitting diode LED1 comprising one-half of the opto-isolator U1 and a resistor R4 are coupled across the capacitor C3. The intensity of the light generated by LED1 is proportional to the voltage across capacitor C3, which in turn is proportional to the welder output voltage.

Optical coupling from the welder circuit to the instruction monitor and particularly to the phototransistor half of the opto-isolator U1 is depicted by the right word pointing arrows. Phototransistor PT1 is influenced by the incident light energy and is caused to become more or less conductive dependent upon the strength of that light energy. The LED1 and PT1 may both be encapsulated together in the form of an opto-isolator of the type specifically identified at the end of this specification.

The collector of phototransistor PT1 is connected to a positive 9 volts (+9 V) through resistors R6, R7, and the emitter is coupled to ground. The +9 volt operating voltage may be supplied by either batteries or an AC/DC converter.

A capacitor C4 is respectively coupled across the collector and emitter of phototransistor PT1 to develop a voltage potential which is proportional to the effective resistance of the phototransistor PT1 and the resistors R6, R7. That voltage is applied to the negative input of the high voltage detector U2 and the positive input of the low voltage detector U3.

Resistor R8 and switch SW1 are provided to demonstrate the operation of the high and low voltage detectors and tone generators. In general, one may demonstrate the tones without connecting the device to a welder by closing switch SW1 and adjusting resistors R11 and R15 until tones are generated in the manner described hereafter.

The high and low voltage detectors U2, U3 are coupled to supply voltage and to ground in the manner shown. The "hi set" voltage reference level is established by the variable resistor R15 which is connected between resistors R13 and R14 which are in turn coupled between the supply voltage and ground. Therefore, the adjustment of the variable resistor R15 will set a high voltage reference to the positive input of the high voltage detector U2. Similarly, the negative input terminal of low voltage detector. U3 is coupled to the variable resistor R11 which in turn is connected between resistors R10 and R12 which are in turn coupled between the positive supply voltage and ground. Again, the adjustment of the variable resistor R11 sets a low reference voltage at the negative input of low voltage detector U3.

The output terminals of high and low voltage detectors (comparators) U2 and U3 are coupled to the positive supply through resistors R16 and R17 respectively and to the inputs of high and low pitch tone generators U5 and U4 respectively. Capacitor C6, diode CR2 and resistor R18 couple the output of detector U2 to the input of high pitch tone generator U5 in the manner shown. This circuit automatically shuts off the high tone generator U5 if the welder is left on after a weld is finished and the arc voltage goes permanently high. The circuit turns off in about 3 seconds; after capacitor C6 charges up, current ceases flowing through resistor R18 and pin 4 of U5 is at ground potential. Diode CR2 furnishes a low impedance discharge path for cpacitor C6. Certain terminals of the high pitch tone generator U5 are coupled to biasing components R19, R20, C7 and C8 in the manner specified by the manufacturer to operate the tone generator as a high pitch audio oscillator. Similarly, certain terminals of the low pitch tone generator U4 are coupled to biasing components R21, R22, C9 and C10 in the manner described by the manufacturer to operate the low pitch tone generator as a low pitch audio oscillator.

The outputs of the high and low pitch tone oscillators are coupled through diodes CR3 and CR4 and resistor R23 to the speaker and phone jack. The variable resistor R23 provides for volume adjustment of the resulting audio tone. Audio amplification is effected by transistor U6 which is coupled to resistor R23 through capacitor C11, resistor R24 and diode CR5 and to the speaker and phones.

Turning now to the operation of the circuit of FIG. 2, the full wave bridge 10 is coupled at its input terminals to the electrode and work piece of either an AC or DC welder. The bridge rectifier 10 provides that the connection is insensitive to polarity and develops a DC signal across the capacitor C3 which is proportional to the voltage developed at the welding arc. The flow of current through LED1 and resistor R4 causes emission of light which is the optical or light input to phototransistor PT1.

The variation of current or voltage applied to capacitor C3 is linearly proportional to the voltage and current of the welding arc. The current flow through the LED1 is linearly related to the voltage developed across capacitor C3 and the resulting intensity of the light generated by LED1 is thereby linearly related to the voltage across the welding arc.

The intense light generated by LED1 determines the degree of inductance of phototransistor PT1 which in turn determines the voltage signal applied to the negative and positive inputs of high and low voltage comparators U2 and U3 respectively.

Once the welder has commenced operation, the instructor observes the arc weld length, and based on that observation, manually adjusts the high and low set variable resistors R15 and R11 respectively until high pitch and low pitch tones are generated when the observed arc length is at its maximum and minimum respectively desired length. When the student takes over the operation of the welder and commences welding, he finds that as the arc length increases or decreases to the preset limits, the high and low tone pitches are generated and he adjusts the arc length to shorten and lengthen it respectively.

In reference to the high voltage comparator, it compares the signal voltage with the high set reference voltage, and when the signal voltage is below (below because of the signal inversion in the opto-isolator) the reference voltage, the high voltage detector U5 generates a signal which turns on the high pitch tone generator or oscillator U5. This tone, when observed by the person operating the welder, indicates the arc voltage is too high and that the arc should be shortened to decrease the voltage.

The low voltage detector works in the same manner except that the inputs are reversed, and the detector responds when the signal voltage, coming from the isolator, increases above (above because of the signal inversion in the opto-isolator) the reference voltage set by the low set variable resistor R11. The output from the low voltage detector U3 generates the low pitch audio tone which indicates to the operator that the arc voltage is too low and that the arc should be lengthened.

The output signal of the high voltage comparator and the low voltage comparators are respectively applied to the inputs of the high and low pitch tone generators in the manner previously described. The output signals of the high and low pitch tone generators U5 and U4 are applied through the diodes CR3 and CR4, respectively, to the speaker or to the headphone jacks in the manner previously described. In this fashion, the instruction monitor of the present invention simply and economically provides the student with guides within which to operate the welding equipment until the student has learned to independently observe the audio and the visual attributes of acceptable welds.

The input circuit of the opto-isolator IC is very rugged and will withstand the wide voltage variations produced by the welding arc. The output voltage variations from the isolator are limited to some value less than 9 volts, thus circuits following the opto-isolator are isolated and protected from the wide voltage variations produced by the welding arc. The output from the opto-isolator is also inverted and varies in the opposite direction from that of the welding arc.

The values of the components in the identification of the integrated circuits is as follows.

| | |
|---|---|
| R4, R5 | Determined at calibration |
| R6 | 500 ohm variable |
| R7 | 220 ohm |
| R8 | 820 ohm |
| R11, R12, R14, R15 | 5k ohm variable |
| R10, R13 | 10k ohm variable |
| R16, R17 | 4.7k ohm |
| R18, R19, R21 | 3.9k ohm |
| R20, R22 | 1k ohm |
| R23 | 1.5k ohm |
| R24 | 5.6k ohm |
| R25 | 82 ohm |
| C3 | 100 $\mu f$ |
| C4 | 5 $\mu f$ |
| C5 | .001 $\mu f$ |
| C6 | 220 $\mu f$ |
| C7, C9 | .01 $\mu f$ |
| C8 | .069 $\mu f$ |
| C10 | .147 $\mu f$ |
| C11 | .47 $\mu f$ |
| C12 | 2200 $\mu f$ |
| U1 | MCT 2 |
| U2, U3 | LM 311 |
| U4, U5 | TLC 555 |
| U6 | 4008 |
| CR2, CR3, CR4 | 1N 4003 |

While one specific embodiment of the invention has been illustrated and described in detail herein, it is obvious that many variations and modifications may be made which would be obvious to one of ordinary skill in the art without departing from the spirit of the claimed invention.

What is claimed is:

1. Electric welding apparatus including an arc electrode, a workpiece, a power supply connected with said electrode and workpiece to establish an electric arc therebetween, and a monitor circuit for monitoring the arc length, said monitor circuit comprising:

first means adapted to be coupled to said apparatus for providing an input signal proportional to the arc voltage or current across the electric welding arc;

isolating means responsive to said input signal for providing an isolated output signal electrically isolated from said arc welder;

reference level setting means for providing a reference signal level;

comparator means responsive to said reference signal level and said output signal for providing a trigger signal when the level of said output signal is equal to or exceeds said reference signal level;

indicating means responsive to said trigger signal for indicating that the welding arc length is reaching a limit set by said reference signal level;

wherein said isolating means further comprises optical coupling means comprising a light-emitting diode in operative connection with a photo-transistor for electrically isolating the input signal from the reference level means, the comparator means and the indicating means, and wherein:

said light-emitting diode is coupled to said first means and provides an optical signal in linear proportion to the amplitude of said input signal; and said phototransistor is coupled to said comparator for providing said output signal having an amplitude linearly proportional to the amplitude of said optical signal.

2. The apparatus of claim 1 wherein said indicating means further comprises audio signal generating means responsive to said trigger signal for providing an audio alarm signal.

3. The apparatus of claim 1 wherein said reference level setting means further comprises:

a high set reference level signal generating means which is adjustable to set an upper acceptable limit on arc length; and a low set reference level signal generating means which is adjustable to set a lower acceptable limit on arc length;

and wherein said comparator means further comprises:

high voltage comparator means coupled at one input to said output signal and at further input to said high set reference level signal for providing a high voltage trigger signal when said output signal amplitude in comparison to said high set reference level signal indicates that said arc length exceeds the upper acceptable arc length limit; and low voltage comparator means coupled at one input to said output signal and at a further input to said low set reference level signal for providing a low voltage trigger signal when said output signal amplitude in comparison to said low set reference level signal indicates that said arc length is shorter than the lower acceptable arc length limit;

and further comprising:

means for applying said high voltage trigger signal or said low voltage trigger signal to said indicating means.

4. The apparatus of claim 3 wherein said indicating means further comprises:

first tone generating means responsive to said high voltage trigger signal for providing a first audio tone; and second tone generating means responsive to said low voltage trigger signal for providing a second audio tone;

whereby said operator my be alerted to shorten or lengthen the arc length on hearing the first or second audio tone.

* * * * *